June 1, 1965 J. A. BROUX ETAL 3,187,101
TIME DIVISION MULTIPLEX RESONANT TRANSFER SYSTEM
Filed Dec. 4, 1961
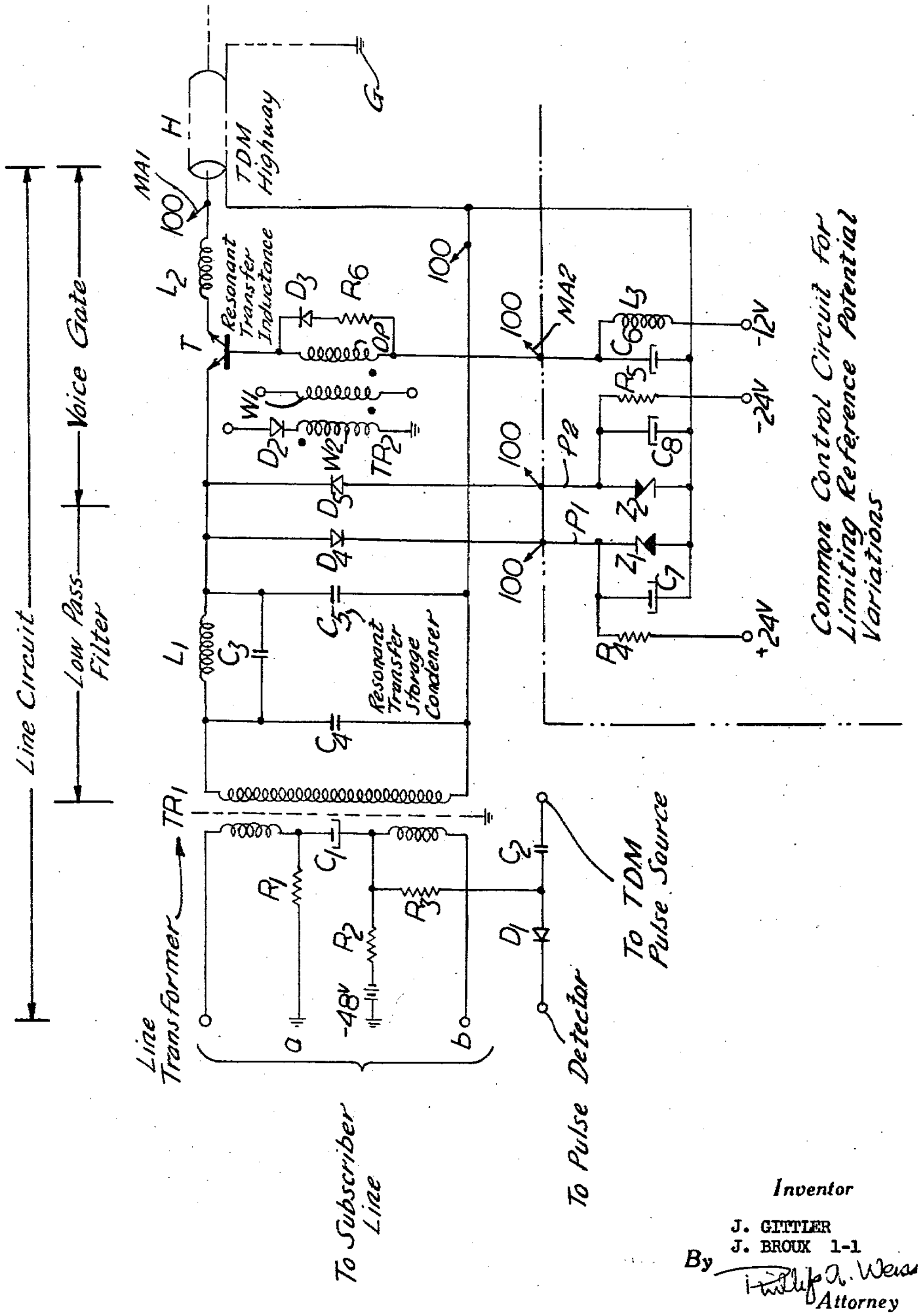
Inventor
J. GITTLER
J. BROUX 1-1
By Phillip A. Weiss
Attorney 3,187,101
Patented June 1, 1965

3,187,101

TIME DIVISION MULTIPLEX RESONANT TRANSFER SYSTEM

Joseph A. Broux, Antwerp, Belgium, and Jean Frederic Fernand Gittler, Paris, France, assignors to International Standard Electric Corporation, New York, N.Y., a corporation of Delaware Filed Dec. 4, 1961, Ser. No. 156,609
6 Claims. (Cl. 179—15)

The invention relates in general to electrical line circuits and in particular to subscriber's line ircuits for electronic telephone systems operating on a time division multiplex basis and using resonant transfer principles for pulse amplitude modulated signals.

Such a system is disclosed for instance in the United States patent application of K. Cattermole et al. Serial No. 663,704, filed June 5, 1957, now Patent No. 3,073,903, and assigned to the same assignee as this application. That application discloses an electronic telecommunication system and particularly a time devision multiplex system wherein the pulse amplitude modulated signals are transmitted substantially without losses and in both directions with the help of so-called resonant transfer circuits which are made effective by rendering a series of gates conductive; these gates being preferably constituted by symmetrical junction transistors. In such electronic switching systems where instead of cheap mechanical contacts the speech circuits now include relatively more expensive electronic gates, it is desirable to reduce the gate expenses by establishing unbalanced connections between two subscribers in order to avoid duplicating the gates at each crosspoint. Means to achieve this have been disclosed in the United States patent application of H. H. Adelaar, Serial No. 55,631, filed on September 13, 1960, now Patent No. 3,132,210, and assigned to the same assignee as this application.

Although common grounding of the line circuits reduces the number of gates required, it increases the problem of crosstalk. Therefore an object of this invention is to realize an improved and inexpensive common grounding arrangement which also limits the crosstalk in the time division multiplex system to an acceptable value.

In line circuits of the type contemplated above, a line transformer has to be used. When the subscriber lifts his receiver from the cradle, a transient voltage is induced across the secondary winding of the transformer which is coupled to the individual transistor gate included in the subscriber's line circuit through a low-pass filter including the storage condenser used for the resonant transfer of the energy. The induced voltages may be substantial, particularly when a higher impedance level is used on the secondary side to reduce the current through the transistor switch, and they may reach values above those which the transistor gate can normally withstand. Hence, a limiter must be introduced to protect the transistor from such damagingly high voltages.

Another object of the invention is to realize an improved voltage limiting arrangement in an efficient yet inexpensive manner.

Yet another object of the invention is to provide a line circuit of the above described nature while using a minimum of equipment by making it feasible to use common equipment for controlling the gate and for voltage limiting.

In accordance with a characteristic of the invention, an electrical line circuit as defined at the beginning of this description is characterized by the fact that said common return path is gounded only at the central part of the communication network. At each line circuit, the return path is coupled through a winding of an individual line transformer to a gate associated with said line circuit. The return path is also coupled to the control terminal of said associated gate through a high-pass filter the common terminal of which is connected to a D.C. potential adapted to control the gate.

In accordance with another characteristic of the invention, said high-pass filter is provided in common for a plurality of said line circuits.

In accordance with yet another characteristic of the invention, said high-pass filter comprises a series condenser of suitably high value coupling said return path to said control terminal. The condenser plate on the side of the control terminal is coupled to said D.C. potential through a shunt inductance.

In this manner, a suitable bias may be provided for the NPN or PNP symmetrical junction transistor acting as a gate, but from the A.C. view point, this D.C. potential is fully decoupled from the communication circuits and the latter are only grounded at the central part of the communication circuits.

According to a further characteristic of the invention, said return path is also coupled to two Zener diodes oppositely poled, each shunted by a condenser of suitably high value. The other ends of the Zener diodes are connected to corresponding D.C. potentials via respective resistances of relatively high value. The other ends of the Zener diodes are also connected in parallel to a plurality of said line circuits via correspondingly poled individual rectifiers, the pair of individual rectifiers per circuit constituting a two-way limiter.

In this manner, the expensive part of the limiting arrangement constituted by the Zener diodes may be used in common for a plurality of line circuits. Preferably if a number, e.g. 100, of line circuits are associated with a highway constituted by a length of co-axial cable, the screen conductor of the latter will be connected on the line circuit side to the condenser part of the high-pass filter as well as to the two Zener diodes. Thus, the filter and limiter arrangement are also provided in common for the group of, e.g. 100, line circuits.

The above objects and features of the invention as well as others and the best manner of attaining them as well as the invention itself will be best understood from the following description of an embodiment thereof to be read in conjunction with the accompanying drawing representing a line circuit for an electronic telephone system operating on a time division multiplex basis and using the resonant transfer principle for pulse amplitude modulated signals.

To decouple the subscriber's loop circuit from the low-pass filter and the high frequency circuit, an isolating voltage step-up individual line transformer $TR_1$ is shown in the figure. This transformer matches impedance and transforms the impedance level of 600 ohms on the loop side to a higher level of 2000 ohms on the exchange side. The line conductors *a* and *b* are connected to the outer ends of two equal primary windings of this transformer whose inner ends are interconnected by the D.C. isolating electrolytic condenser $C_1$. These inner ends are also connected to ground and to the negative battery of −48 volts respectively through resistor $R_1$ on the *a*-side and resistor $R_2$ on the *b*-side. The end of resistor $R_2$ that is not connected to battery is coupled to the junction point of a condenser $C_2$ and a rectifier $D_1$ through resistor $R_3$. When the subscriber's loop between *a* and *b* is open circuited, a potential approximately equal to the negative battery is present at the junction of rectifier $D_1$ and condenser $C_2$. This negative potential is sufficient to block the passage through diode $D_1$ of a call detection pulse that is periodically applied to the right-hand terminal of condenser $C_2$. When the subscriber's loop is closed, the negative potential decrease is sufficient to allow the passage of such a pulse; thus, the origination of the call is detected.

The secondary winding of transformer $TR_1$ which is separated from the split primary winding by a grounded screen is coupled to the inner and outer conductors of a co-axial cable H constituting the highway or time division multiplex link to which, as indicated by the multipling arrow MA1, a hundred line circuits are connected in parallel. The live conductor from the secondary winding is connected to the inner co-axial conductor through inductance $L_1$ which is part of a low-pass filter in series with a gate constituted by a symmetrical NPN junction transistor T and finally a second series inductance $L_2$ used for the resonant transfer. The other end of the secondary winding of $TR_1$ is directly connected to the outer conductor of the co-axial cable H and this constitutes the return path of the circuit.

As shown, the low-pass filter in addition to coil $L_1$ shunted by condenser $C_3$ also includes the shunt condensers $C_4$ and $C_5$. This low-pass $\pi$-section is used to recover the voice frequency signals from the pulse amplitude modulated signals. The condenser $C_5$ shunted by the series combination of condensers $C_3$ and $C_4$ also constitutes the so-called storage condenser of the resonant transfer circuit which is established with the help of the series transfer inductance $L_2$ when transistor T is made conductive. A similar circuit is of course established at the other subscriber's end, while one or more gates interconnecting the subscriber's highways are made conductive.

At the central part of the exchange, the highways such as H will be interconnected by additional gates (not shown) preferably in the manner disclosed in the United States patent application, Serial No. 55,631 (H. Adelaar). Equipment at the distant end of the highway H supplies a ground potential G via the outer conductor of the co-axial cable, to a plurality of 100 line circuits as indicated by the corresponding multipling arrow MA2. To permit the transmission of signals, this common ground return is also connected through an electrolytic condenser $C_6$ of suitably high value to a point which is then also multipled to the 100 line circuits. More particularly, this ground is multipled towards the bases of the 100 transistors (such as T) to which it is connected via the output winding OP of a three-winding access selector transformer $TR_2$.

This access selector transformer $TR_2$ is included in a matrix of 10 x 10 transformers. The windings $W_1$ immediately on the left of the output windings are serially connected for a column of 10 transformers across a suitable energy source. On the other hand, the outer left windings $W_2$ with a grounded end are paralleled through the individual rectifiers such as $D_2$ for each row of 10 transformers. Each of the ten rows of ten paralleled windings is normally short-circuited by a common row transistor (not shown). A common column transistor acts as a switch to supply energy to the corresponding set of series connected column windings $W_1$. When the row transistor is blocked for a particular row while a column transistor is also blocked, the transformer $TR_2$ at the crosspoint of the selected row and column releases a suitable current pulse to the base of transistor T in order to unblock the latter. Rectifier $D_3$ in series with resistor $R_6$ is provided in shunt across the output winding OP of transformer $TR_2$ as an alternative path instead of transistor T when the current pulse subsides and the transistor T is again blocked.

In this manner the transistor T is unblocked by the base current provided by a high impedance pulse source and when blocked the base impedance is low due to the short-circuited outer left windings of $TR_2$.

The upper terminal of condenser $C_6$ is connected to a suitable negative battery bias of —12 volts through inductance $L_3$ thus normally biasing the NPN transistors T to the blocked condition. Inductance $L_3$ achieves a complete decoupling from the A.C. view point of this —12 volts D.C. supply source so that only the central ground is operative.

The common part of the circuit provided for the 100 line circuits also includes the Zener diodes $Z_1$ and $Z_2$ which respectively connect the common ground coming from the central part of the exchange to two points at which suitable limiting voltages above and below said common ground potential will be respectively provided. This is achieved by the sources of + and —24 volts which feed the oppositely poled Zener diodes $Z_1$ and $Z_2$ through resistors $R_4$ and $R_5$, being decoupled for high frequency by suitable electrolytic condensers $C_7$ and $C_8$ respectively. These shunt condensers may for instance have a value of 10 microfarads, the resistors $R_4$ and $R_5$ having a value of 100 kilo-ohms. The two common limiting voltage points are then multipled as indicated through oppositely poled individual diodes $D_4$ and $D_5$ respectively to the junction point of the low-pass filter, i.e. right-hand side of inductance $L_1$, with the transistor gate T.

If transistors of the same conductivity type are used for the various gates intervening for establishing the communication path, the switching base currents used to periodically unblock the transistors will give rise to a D.C. bias on the transmission circuit. In order to avoid distortions of the signals, the limiter including the diodes $D_4$ and $D_5$ will have these diodes biased to D.C. levels of opposite polarity and distinct magnitudes in order to take into account the D.C. bias introduced by the switching currents used for unblocking the transistors. These distinct limiter voltages may readily be provided by adequate selection of the Zener diodes $Z_1$ and $Z_2$.

The transfer inductance $L_2$ is used to establish a series resonant circuit with the condenser $$C_5+\frac{C_3C_4}{C_3+C_4}$$

when the various gates such as T involved in the communication circuit are closed during a switching time which is equal to half the natural period of resonance. This inductance $L_2$ may be inserted at various places in the circuit, but as shown, between the transistor gate T and the common highway, it decouples any spurious capacitance between the transistor and ground.

Briefly in resume, the drawing shows one among one hundred line circuits having access to a time division highway H. Each line circuit contains a resonant transfer circuit (capacitor $C_5$ and inductance $L_2$). The transistor T switches "on" and "off" to selectively gate voice signals from the subscriber line *a, b* onto the highway H and thence to another subscriber line via a similar line circuit. A common source is used to provide bias potentials which control the operation of the transistor T in each of the line circuits. If this source drifts away from a stable reference voltage, it becomes a source of crosstalk. Thus, the number of lines in the resonant transfer system would be severely limited by the crosstalk considerations.

To avoid this crosstalk, the common source is connected to the transistor T via a circuit including Zener diodes $Z_1$, $Z_2$ and capacitors $C_6$, $C_7$, $C_8$. At very low frequencies, voltage variations do not occur because the capacitors $C_6$–$C_8$ change or discharge to maintain uniform potentials at points $P_1$, $P_2$. At extremely high frequencies, the currents through resistors $R_4$, $R_5$ do not change appreciably and the points $P_1$, $P_2$ continue to remain at the stable 3rd battery voltages.

While the principles of the invention have been described above in connection with specific apparatus, it is to be clearly understood that this description is made only by way of example and not as a limitation on the scope of the invention.

We claim:

1. A time division multiplex telephone system comprising a plurality of subscriber lines, at least one time division multiplex highway, and groups of line circuits for selectively connecting said lines to said highway on a time division multiplex basis, gate means comprising a resonant transfer circuit in each of said line circuits for selectively transferring signals from one of said lines over said highway to another of said lines, means including a source of potential common to each group of line circuits for supplying each of said resonant transfer circuits whereby said common source constitutes a source of crosstalk within said group, and common voltage variation isolating means interposed between said resonant transfer circuits of each group of line circuits and said source of potential to regulate said potential thereby eliminating said source of crosstalk within said group.

2. The system of claim 1 wherein said isolating means comprises means including a series of decoupling capacitors for preventing voltage variations in the circuits for controlling the operation of said resonant transfer circuits.

3. The system of claim 2 wherein each of said resonant transfer circuits comprises a transistor means, and said isolating means comprises a circuit for biasing and controlling the operation of said transistor.

4. The system of claim 3 wherein said transistor means is effectively interposed between said line and said highway and between said isolating means and said highway.

5. In the telephone communication system of claim 1 wherein said highway comprises two terminals, said isolating means comprising two oppositely poled Zener diodes effectively connected between said two terminals of said highway, condenser means for A.C. shunting of said diodes, high resistance means, and positive and negative D.C. potential sources connected respectively to one end of each of said Zener diodes through said high resistance means.

6. In the telephone exchange system of claim 5 where said Zener diodes are of such value to compensate for any D.C. voltage introduced in the communication system by switching currents used to control the gates.

References Cited by the Examiner

UNITED STATES PATENTS 2,917,583 12/59 Burton et al. ------------ 179—15

FOREIGN PATENTS 824,222 11/59 Great Britain.

DAVID G. REDINBAUGH, *Primary Examiner.*